United States Patent
Johanson et al.

(10) Patent No.: US 11,548,045 B2
(45) Date of Patent: Jan. 10, 2023

(54) CABLE SHEATHING OF A PB—CA—SN ALLOY AND METHOD OF MANUFACTURE THEREOF

(71) Applicant: NEXANS, Courbevoie (FR)

(72) Inventors: Audun Johanson, Oslo (NO); Arild Larsen, Klavestadhaugen (NO)

(73) Assignee: NEXANS, Courbevoie (FR)

( * ) Notice: Subject to any disclaimer, the term of this patent is extended or adjusted under 35 U.S.C. 154(b) by 105 days.

(21) Appl. No.: 16/715,134

(22) Filed: Dec. 16, 2019

(65) Prior Publication Data

US 2020/0254498 A1    Aug. 13, 2020

(30) Foreign Application Priority Data

Dec. 21, 2018    (EP) .................................... 18306822

(51) Int. Cl.
| | |
|---|---|
| *B21C 23/30* | (2006.01) |
| *C22C 11/06* | (2006.01) |
| *H01B 7/14* | (2006.01) |
| *H01B 7/20* | (2006.01) |
| *B21C 33/02* | (2006.01) |
| *B29C 48/154* | (2019.01) |
| *H01B 13/14* | (2006.01) |

(52) U.S. Cl.
CPC .............. *B21C 23/30* (2013.01); *B21C 33/02* (2013.01); *B29C 48/154* (2019.02); *C22C 11/06* (2013.01); *H01B 7/14* (2013.01); *H01B 7/204* (2013.01); *H01B 13/14* (2013.01); *H01B 7/20* (2013.01)

(58) Field of Classification Search
CPC ......... B21C 23/24; B21C 23/26; B21C 23/30; B21C 33/02; C22C 11/06; C22C 11/00; H01B 7/14; H01B 7/204; H01B 7/20; H01B 7/2825; H01B 13/14–148; C22F 1/12; B29C 48/154; Y02A 30/14
See application file for complete search history.

(56) References Cited

U.S. PATENT DOCUMENTS

| | | | | |
|---|---|---|---|---|
| 1,654,526 | A * | 1/1928 | Brown | B21C 23/30 |
| | | | | 72/270 |
| 2,049,938 | A * | 8/1936 | Anderson | B21C 29/00 |
| | | | | 148/522 |
| 2,159,124 | A * | 5/1939 | Betterton | C22C 11/06 |
| | | | | 420/565 |
| 2,380,722 | A * | 7/1945 | Brown | B21C 33/02 |
| | | | | 72/38 |
| 3,756,312 | A * | 9/1973 | Shah | H01B 13/14 |
| | | | | 165/206 |
| 2014/0060884 | A1 | 3/2014 | Patel | |

FOREIGN PATENT DOCUMENTS

GB            726007         3/1995

OTHER PUBLICATIONS

EU Search Report dated May 29, 2019.

* cited by examiner

*Primary Examiner* — Jeffrey M Wollschlager
(74) *Attorney, Agent, or Firm* — Sofer & Haroun, LLP

(57) ABSTRACT

A method for manufacturing a sheathing of a cable and a sheathing for a cable is provided where the method includes forming the cable sheathing by extrusion and the sheathing is made of a Pb—Ca—Sn alloy having a composition having from 0.03 to 0.05 weight % Ca and from 0.4 to 0.8 weight % Sn.

13 Claims, 7 Drawing Sheets

CABLE SHEATHING OF A PB—CA—SN ALLOY AND METHOD OF MANUFACTURE THEREOF

This application claims the benefit of priority from European Patent Application No. 18 306 822.0, filed on Dec. 21, 2018, the entirety of which is incorporated by reference.

The present invention relates to a method for manufacturing a sheathing of a cable.

BACKGROUND

Supplying electric power from land to offshore oil and gas installations, landing electric power produced at offshore windfarms, etc. may require transporting capacity of electric energy at high power levels over long distances. This is often accomplished by use of power cables which are laid on the seabed.

Power cables intended for submarine use may be intended to operate at high power levels at voltages from less than 1 kV to more than 500 kV and be sufficiently mechanically resilient to withstand stretching forces combined with dynamic flexing for a lifetime of up to 60 years. The submarine power cable should also be water tight and corrosion resistant to protect the electric power conducting core of the cable from being exposed to water.

PRIOR ART

A common solution for water protection of the electricity conducting inner core of subsea cables is to employ a metallic tubular sheathing surrounding the electric conductors at the inner core which blocks seawater from entering the interior of the sheathing. The metallic tubular sheathing provides further a mechanical protection of the inner core, and it is due to being electrically conductive an electric screening of the high-voltage electric conductors at the inner core and will function as an emergency-conductor of electric charges in case damages causes short-circuit currents in the cable.

The metallic sheathing should be sufficiently mechanically robust to prevent seawater from entering the insulation layers of the electric conductors and to withstand the static and dynamic fatigue loads to which the cable will be subject during its operational lifetime. The metallic sheathing may advantageously be made as thin as possible to save weight and material costs without compromising on the mechanical robustness.

Document US 2014/0060884 teaches that copper, lead and lead-alloys such as E-alloy (0.4 wt % Sn and 0.2 wt % Sb) or B-alloy (0.85 wt % Sb), have been commonly applied as water-blocking metallic sheathings in subsea cables, but that these materials have shown less satisfactory resistance towards fatigue and may be subject to cracking when applied in heavier cables and/or in dynamic application. The solution to this problem according to claim 1 of this patent document is to apply as water-blocking metal sheathing, a copper alloy of either; Cu and Ni; Cu and Be; Cu and Zn; or Cu, Zn, and Al.

Document U.S. Pat. No. 2,159,124 teaches use of Pb—Ca—Sn alloys with composition 0.01 to 0.1% Ca and 0.35 to 1.75% Sn, Pb as balance, in battery grids and cable sheathings. The addition of Sn is disclosed to be imparting improved tensile strength to the alloy. On extruded material, tensile strength values of about 6500 lbs/sq.in. (approx. 45 MPa) were obtained for the calcium-lead-tin alloy. Fatigue strength was found to be approx. 1700 lbs/sq.in. (approx. 12 MPa) for 20 million cycles at 2000 r.p.m. These figures are described to be favourable for using the alloy in cable sheathings and battery grids.

Sivaraman Guruswamy [ref. 1] discusses on page 579 various lead alloys used in cable sheathing and informs that alloying elements such as Sn, Sb, Cu, Te, Bi, Ca, Cd, and As are in use, and that these allying additions improve mechanical properties of lead by solid solution and precipitation strengthening. In Table 33 on page 580, it is listed several lead alloys of commonly used cable-sheathing alloys. The table lists alloy PB051 (composition: Pb—0.033 Ca—0.38 Sn) and informs that it is used in long high-voltage DC and AC submarine cables.

Document DE 2 758 940 teaches hardenable Pb—Ca—Sn alloys having improved strength and corrosion resistance for use in grids for lead batteries, cable sheathings and other applications. The composition of the alloy is disclosed to be from 0.02 to 0.1 wt % Ca and that the atomic ratio Sn:Ca is to be at least 3:1, corresponding to a Sn content of from at least 0.18 wt % Sn to at least 0.89 wt % Sn. The document discloses that the it is precipitation of $CaSn_3$ which provides the improved strength and corrosion properties.

The handbook, "Extrusion", [ref. 2], informs on pages 126-127 that cable sheathing made of lead or lead alloys have been extruded directly onto cable cores for more than 100 years, since the invention of cable sheathing by Borell in 1879. Lead can be worked at relatively low temperatures such that the coating does not overheat the inner core of the cable.

Power cables may have lengths of many kilometres and should advantageously be produced continuously, i.e. be produced in one length without stops or joints. The cable sheathing process should thus advantageously also be made continuous. Available continuous metal extrusion processes include screw extrusion and conform extrusion. The former is particularly suitable for insertion of a cable core, whereby the sheathing is extruded as tube around the cable core.

The principle of forming a sheathing around a cable core by extrusion is illustrated in FIG. 3.84 of ref [2]. A facsimile of the figure is given as FIG. 1 herein. As shown on the figure, a cable sheathing material (3) located in a container (2) is being pressed by an extrusion stem (1) towards and into a cavity formed inside a die head (4). A cable (6) to be coated with the cable sheathing material enters into the cavity of the die head via a hollow mandrel (8) which protrudes a distance into the cavity of the die head, and passes through the cavity and exits the die head (5) via a die (7) having an opening with a cross-section being congruent with but having somewhat larger dimensions than the cross-section of the cable (19). When the extrusion stem (1) is pressed downwards, the cable sheathing material (3) is squeezed into the cavity of the die head (4) and further out through the gap between the outer surface of the cable (6) and the inner surface of the opening of die (4) and forming sheathing (5) covering the cable.

By applying a screw conveyor as the extruder stem (1) and fluidly connecting the space inside the container (2) to a supply for molten lead/lead alloy, the extrusion process may be run continuously. The molten lead/lead alloy supplied to the extruder should solidify inside the extruder, by e.g. having active cooling of the container (2) etc., to enable forming the required extrusion pressure to enable forming a solid sheathing by setting the screw conveyor in rotational motion. An example of prior art applying a screw conveyor to continuously extruding a cable sheathing is shown in e.g. Japanese patent publication JP 2003-088915.

Continuous extrusion technologies can normally not exert the same pressure as discontinues press extrusion, which means that either the output must be reduced, or the extrusion must be limited to soft and formable materials. I.e., screw extrusion is favored by using an as soft material as possible.

OBJECTIVE OF INVENTION

The main objective of the invention is to provide a method for manufacturing a Pb—Ca—Sn alloy-based sheathing of a power cable by relatively rapid extrusion.

Description of the Invention

The present invention relates to use of Pb—Ca—Sn alloys having relatively high Ca-contents which promote precipitation of intermetallic compounds, Ca(Pb, Sn)$_3$, which hardens the material to form excellent mechanical properties for use as power cable sheathings but which are relatively soft during the extrusion of the cable sheathing enabling relatively rapid formation of the sheathing by extrusion. More precisely, the present invention is a method for forming a power cable sheathing by extrusion having a Pb—Ca—Sn alloy composition optimised to harden by precipitation of Ca(Pb, Sn)$_3$, but which has relatively low precipitation hardening of the intermetallic compounds during the extrusion process.

The suppression of the precipitation hardening during the extrusion is observed being present when applying an alloy having relatively high calcium and relatively high tin contents. This suppression effect may be enhanced by actively cooling or otherwise lowering the temperature of the Pb—Ca—Sn alloy composition when travelling through the extruder. The use of such lead alloys enables manufacturing the cable sheathing by extrusion at relatively high throughputs (flow volumes) without excessive wear on the extrusion die, and to form a relatively thin but mechanically robust cable sheathing—which gives significant cost reductions due to more efficient manufacturing of the cable and to reduced weight and material consumption per unit length of the cable.

Thus, in a first aspect, the invention relates to a method for manufacturing a cable sheathing, wherein the method comprises the following steps:
applying an extruder comprising:
a supply of molten Pb—Ca—Sn alloy, and
a die-head adapted to receive the power cable to be coated and to exit the cable and simultaneously form a coating of supplied Pb—Ca—Sn alloy onto the power cable,
characterised in that
the Pb—Ca—Sn alloy has a composition comprising of from 0.03 to 0.05 weight % Ca and of from 0.4 to 0.8 weight % Sn, based on the total mass of the alloy and where the balance is Pb and unavoidable impurities.

Alternatively, the Pb—Ca—Sn alloy may comprise from 0.0325 to 0.05 weight % Ca and/or from 0.425 to 0.8 weight % Sn; preferably from 0.035 to 0.05 weight % Ca and/or from 0.45 to 0.8 weight % Sn; more preferably from 0.040 to 0.05 weight % Ca and/or from 0.5 to 0.8 weight % Sn, and most preferably from 0.040 to 0.045 weight % Ca and/or from 0.5 to 0.7 weight % Sn. The unit "weight %" is based on the total mass of the Pb—Ca—Sn alloy. Alternatively, the Pb—Ca—Sn alloy may further comprise one or more of: Ni, Cu, As, Zn, Ag, Sb, Te, or Cd, each element is present in an amount of maximum 0.002 weight %, and the balance is Pb and unavoidable impurities.

The aging/hardening of the Pb—Ca—Sn alloy is believed to be proportional to the total amount of precipitated Ca(Pb, Sn)$_3$ being formed in the alloy. The more of these precipitates being formed in the material of the power cable sheathing, the higher the material strength of the sheathing becomes. This effect points towards applying a Pb—Ca—Sn alloy having relatively high contents of Ca and a matrix solvus line, i.e. a solvus line of the α-Pb phase in equilibrium with the Ca(Pb, Sn)$_3$ phase, at relatively high temperatures. The Pb—Ca—Sn alloy as specified in the first aspect of the invention has therefore a calcium content and a Sn content providing an alloy having a matrix solvus line at around 300° C.

The invention may employ any known extruder able to form a cable sheathing by batch-wise or continuous extrusion. However, the Pb—Ca—Sn alloy should be in the liquid state when entering the extruder to obtain the intended relatively low precipitation hardening of the intermetallic compounds during the extrusion process but being solidified before being extruded into the cable sheathing. Thus, in one example embodiment the extruder may further comprise a stem adapted to solidify the Pb—Ca—Sn alloy having an inlet fluidly connected to the supply of molten Pb—Ca—Sn alloy and an outlet for solidified Pb—Ca—Sn alloy. The term "stem" as used herein encompasses any known or conceivable device adapted to receive molten Pb—Ca—Sn alloy and pass it on as solidified alloy to a die-head of the extruder. An example embodiment of a suited extruder is a screw type extruder where the Pb—Ca—Sn alloy is supplied in the liquid state to a stem comprising a screw housing where the Pb—Ca—Sn alloy is cooled and solidified and simultaneously transported towards and pressed into a cross head die block at high pressure, such as shown in e.g. FIG. 1 of Japanese patent publication JP 2003-088915, and given as a facsimile in FIG. 2 herein (the reference numbers in the facsimile are increased by 10 to avoid confusion with the reference numbers of FIG. 1 herein). As seen on FIG. 2, molten lead/lead alloy is supplied to a screw housing (13) via an inlet (18) and then transported by a rotating screw (14) towards a flow channel (15a) in a cross-die head block (15). The pressure at which the Pb—Ca—Sn alloy is pressed towards the die head block is given by the geometry of the screw housing and screw, screw rotational speed, temperature and material properties of the lead alloy being applied as extruded material. The higher strength of the material, the higher pressure must be asserted by the screw, in order to extrude the material through the die block.

The Pb—Ca—Sn alloy may advantageously be supplied in the form solid ingots to an electrically heated melting pot where the alloy is heated to a temperature around 380° C. The melting point of lead is around 327° C. The electrically heated melting pot may advantageously be located above (in relation to the earth gravity field) the lead inlet of the screw housing such that molten Pb—Ca—Sn alloy may flow by gravity through a feed pipe and into the lead inlet of the screw housing. The screw housing may advantageously be actively cooled by e.g. a cooling water to ensure that the supplied Pb—Ca—Sn alloy solidifies before entering the head-die block.

As used herein, the term "sheathing" encompasses any coating around any type of cable made of the above defined Pb—Ca—Sn alloy, and which is formed by extrusion. Cable sheathings may be denoted as cable jackets in the literature, such that these terms are considered as synonymous and interchangeable terms herein.

A potential drawback of applying an alloy composition having composition range providing a matrix solvus line at around 300° C. is that as soon as the temperature falls below the solvus line, precipitation of Ca(Pb, Sn)$_3$ phases will take place. When the solvus temperature is as high as around 300° C., this effect is expected to be significant when the alloy is being passed through the extruder.

However, it has surprisingly been observed that increasing Sn contents in the alloy suppresses the initial hardening of the alloy sufficiently to enable extruding the material at relatively low flow stresses as seen from FIG. 3. The figure presents measured flow stress in MPa, i.e. the middle value between yield strength and ultimate strength for alloy samples 1A, 1B, 1C, 2A, 2B, 2C, 3A, 3B, and 3C as a function of strain. The composition of the test samples is given in table 1 below. The figure shown that sample 1C (0.039 weight % Ca and 0.20 weight % Sn) had an average flow stress of around 27.5 MPa, sample 2C (0.040 weight % Ca and 0.30 weight % Sn) had an average flow stress of around 19 MPa, and sample 3C (0.037 weight % Ca and 0.40 weight % Sn) had an average flow stress of around 16 MPa. Increasing Sn-content gives a considerable reduction in the average flow stress and thus considerably improved extrudability. This result is surprising in view of the phase diagram of the Pb—Ca—Sn system. FIG. 4 shows a calculated (at 302° C.) isothermal cut of the Pb—Ca—Sn phase diagram near the pure Pb corner. The matrix solvus line of the phase diagram gives that for a Pb—Ca—Sn alloy having 0.04 weight % Ca, the system will be in the solid solution region when the Sn content is less than about 0.45 weight %. At higher Sn-contents, the system will consist of at least two solid phases of which one is the hardening precipitates such that the phase diagram indicates that we should expect to observe an increase in the average flow stress from sample 1C to 3C. However, the observations presented graphically in FIG. 3 show that samples 2A to 2C had a significantly lower flow stress than samples 1A to 1C despite having a higher Sn-content than the samples, and likewise that samples 3A to 3C having an even higher Sn content had an even lower average flow stress. The minimum 0.4 weight % Sn alloying content of the present alloy composition has surprisingly been observed to suppress the precipitation of Ca(Pb, Sn)$_3$ phases sufficiently to provide a comparably much softer Pb—Ca—Sn alloy enabling producing a power cable sheathing by continuous extrusion at relatively high flow volumes. The formed sheathing hardens over the next 6-8 months due to natural (low temperature) precipitation of Ca(Pb,Sn)$_3$.

In the tests where the average flow stress was in the order of 15-16 MPa, the extruder could be run at >23 kg/min, as compared to typically 18-20 kg/min for prior art extrusion of cable sheathing made of comparable strength lead alloys.

Another surprising observation is that the flow stress may be further lowered by lowering the temperature of the Pb—Ca—Sn alloy during its travel through the extruder. This feature provides the benefit of enhancing the advantage of enabling extruding the cable sheathing at relatively higher volume rates and simultaneously reduces the formation of high-temperature precipitates which diminishes the age hardening effect of the cable sheathing—which could lead to mechanically relatively weak cable sheathings.

The invention according to the first aspect may in one example embodiment further comprise the steps of:

supplying the Pb—Ca—Sn alloy at a temperature of from 350 to 380° C. to the stem of the extruder, and cooling and solidifying the Pb—Ca—Sn alloy inside the stem of the extruder to reach a temperature in the range of from 180 to 250° C. when exiting the stem and entering the cavity of the die-head.

Without being bound by theory, it is believed that the lowering of the temperature of the Pb—Ca—Sn alloy during the extrusion reduces the high-temperature precipitation rate of Ca(Pb, Sn)$_3$ sufficiently to slow down the precipitation hardening during the extrusion of the alloy which more than compensates for the hardening effect of the temperature decrease. I.e., the relatively low temperature and relatively low Ca(Pb, Sn)$_3$ containing alloy is softer and may be extruded at higher volume rates than a relatively high temperature and relatively high Ca(Pb, Sn)$_3$ containing alloy. In practice, this effect is obtained when the liquid Pb—Ca—Sn alloy entering the stem of the extruder is cooled and solidified inside the stem to reach a temperature in the range of from 180 to 250° C. when exiting the stem and entering the cavity of the die-head, preferably of from 190 to 225° C., and most preferably of from 190 to 210° C.

The lowering of the temperature in the stem of the extruder may be obtained by active cooling. This may be obtained by one or more cooling fluid conduits in the wall of the stem and regulate the flow volume of a cooling fluid through the cooling fluid conduits according to output from a temperature sensor reading the temperature of the Pb—Ca—Sn alloy at the exit of the stem. The active cooling may advantageously be adapted to reduce the temperature of the Pb—Ca—Sn alloy inside the stem from its initial molten state to the solid state and the intended temperature of 180 to 250° C., preferably of from 190 to 225° C., and most preferably of from 190 to 210° C. in less than 3 minutes, preferably less than 2.5 minutes.

An advantage of the invention, more precisely the alloy composition and optionally the temperature control in the stem which provides a relatively soft as-extruded material, is that the sheathing may be produced by continuous extrusion at higher flow volumes. This has the advantageous effect of lowering the travel time of the alloy through the extruder which reduces the amount of precipitates being formed in the alloy during its travel through the extruder. The travel time through the extruder may advantageously be less than 7 minutes, preferably less than 6 minutes, more preferably less than 5 minutes, more preferably less than 4 minutes and most preferably less than 3.5 minutes.

In a third aspect, the invention relates to a sheathing for a cable, characterised in that the sheathing is made of a Pb—Sn—Ca-alloy having a composition comprising of from 0.03 to 0.05 weight % Ca and of from 0.4 to 0.8 weight % Sn, based on the total mass of the alloy and where the balance is Pb and unavoidable impurities.

Alternatively, the sheathing is made of a Pb—Sn—Ca-alloy having a composition comprising of from 0.0325 to 0.05 weight % Ca and/or from 0.425 to 0.8 weight % Sn; preferably from 0.035 to 0.05 weight % Ca and/or from 0.45 to 0.8 weight % Sn; more preferably from 0.040 to 0.05 weight % Ca and/or from 0.5 to 0.8 weight % Sn, and most preferably from 0.040 to 0.045 weight % Ca and/or from 0.5 to 0.7 weight % Sn. The unit "weight %" is based on the total mass of the Pb—Ca—Sn alloy. Alternatively, the Pb—Ca—Sn alloy may further comprise one or more of: Ni, Cu, As, Zn, Ag, Sb, Te, or Cd, each element is present in an amount of maximum 0.002 weight %, and the balance is Pb and unavoidable impurities.

The sheathing according to the third aspect of the invention may be for a subsea power cable.

LIST OF FIGURES

Figure 1:
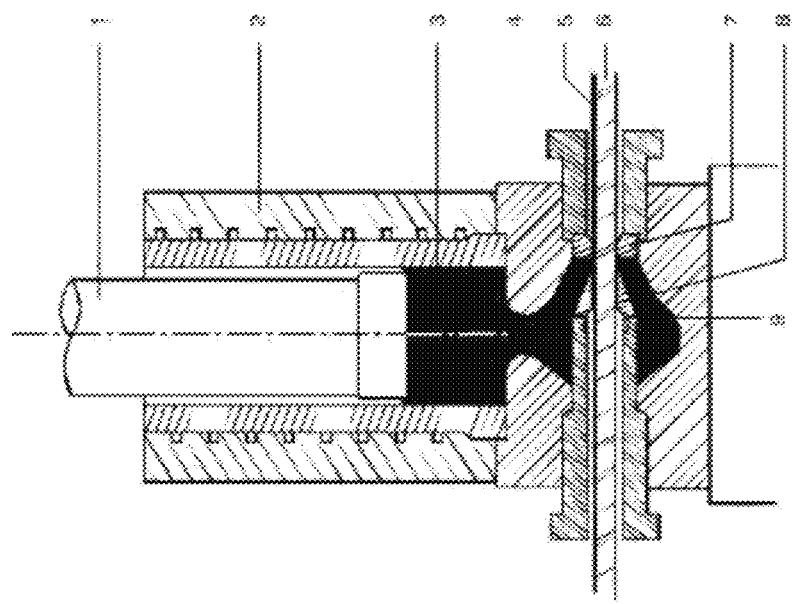
FIG. 1 is a facsimile of FIG. 3.84 of ref 2 illustrating a typical extruder for producing a sheathing around a cable.
Figure 2:
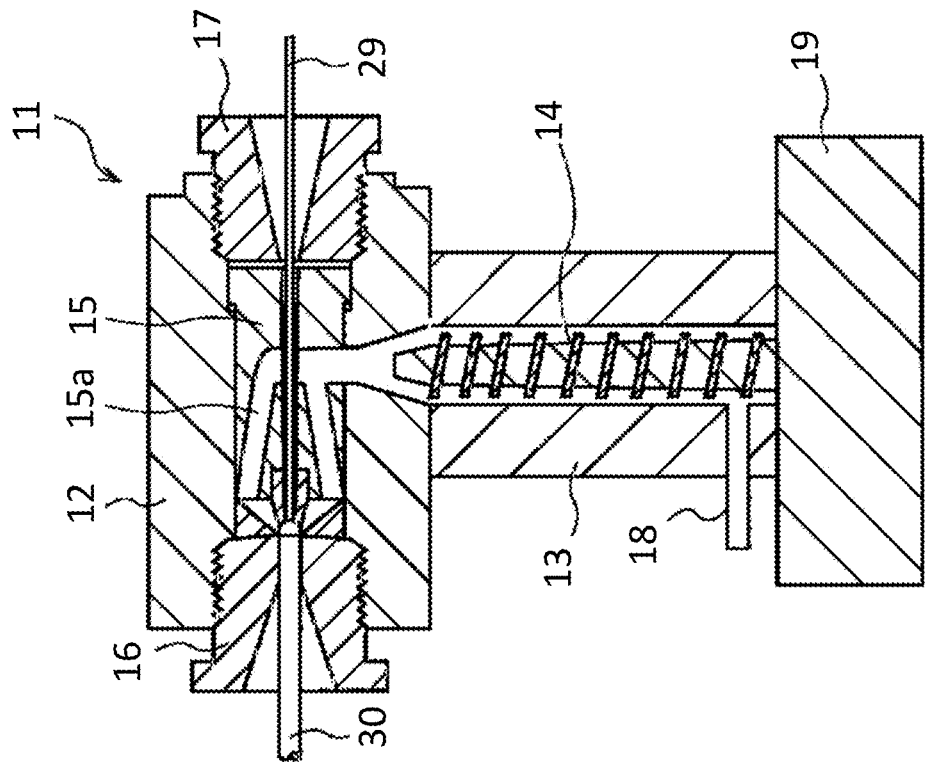
FIG. 2 is a facsimile of FIG. 1 of JP 2003-088915 illustrating an example of a screw type continuous extruder.
Figure 3:
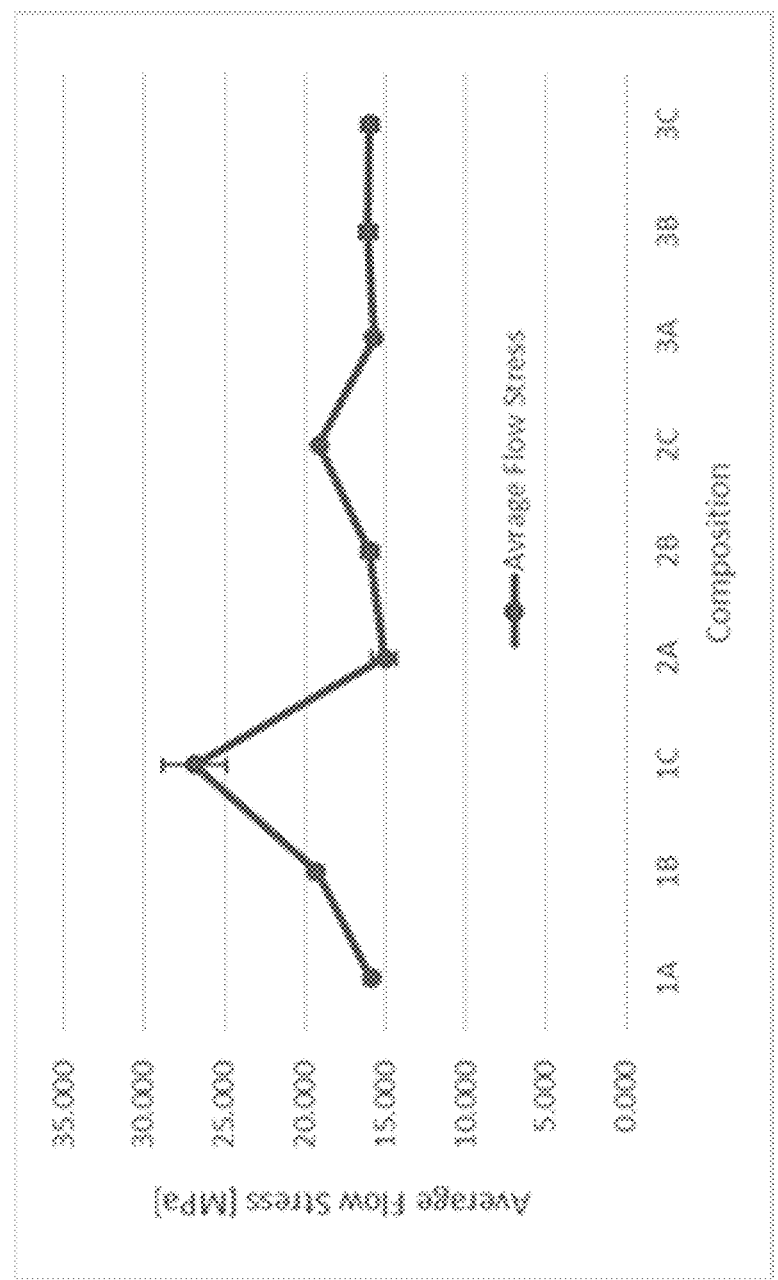
FIG. 3 is a graphical presentation of measured average flow stress for a set of samples of Pb—Ca—Sn alloys having the compositions as given in Table 1.
Figure 4:
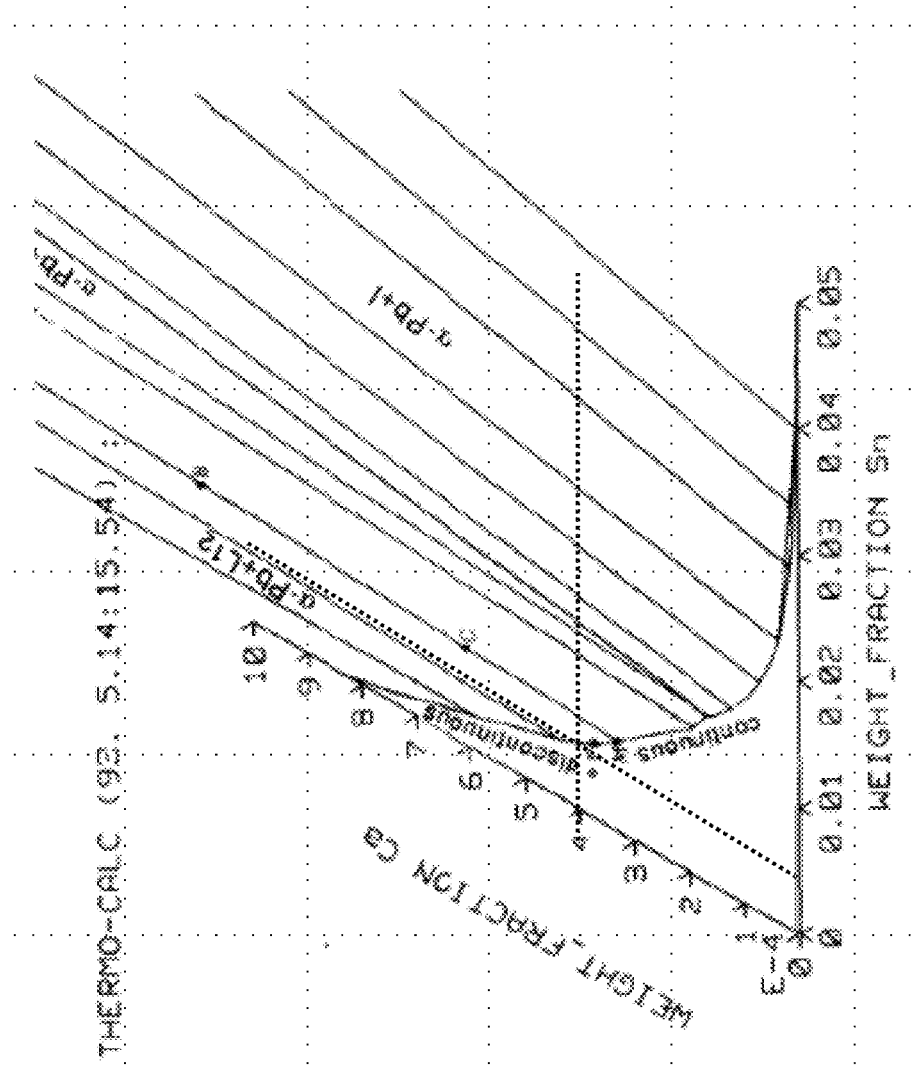
FIG. 4 shows an isothermal cut of the Pb—Sn—Ca phase diagram calculated for a temperature of 302° C. near the pure Pb corner.
Figure 5:
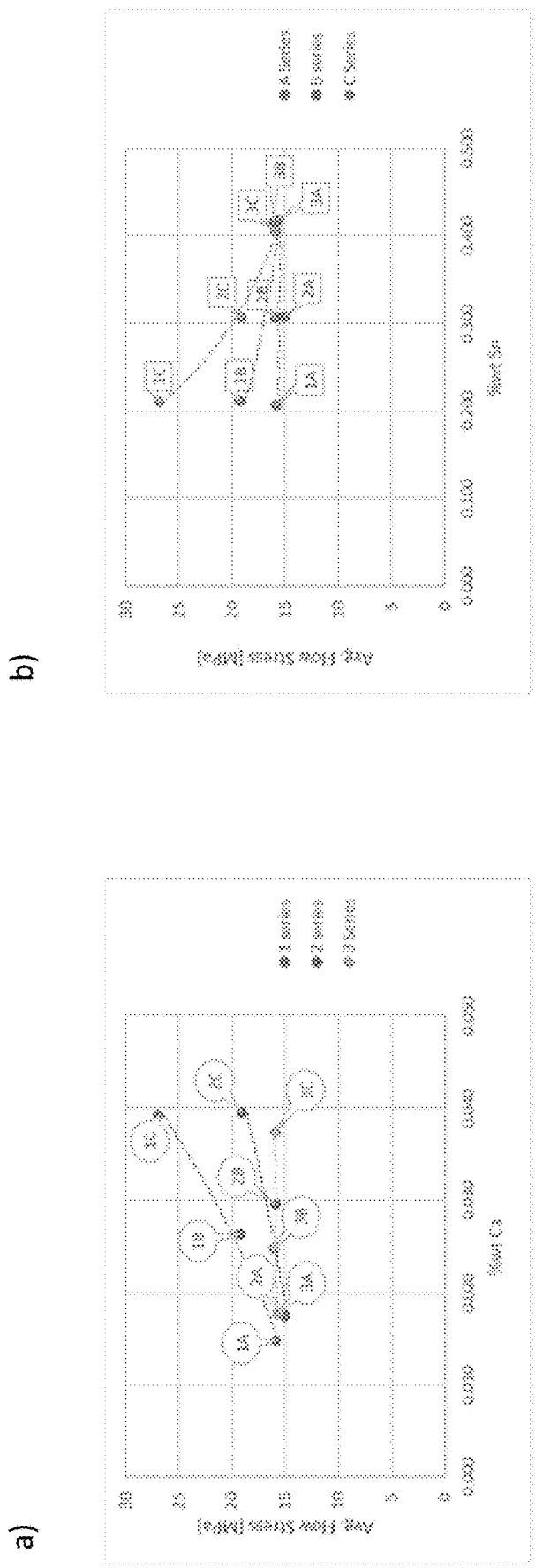

FIGS. 5a) and b) are charts showing measured flow stress for the same samples of Pb—Ca—Sn alloys as presented in FIG. 4.

Figure 6:
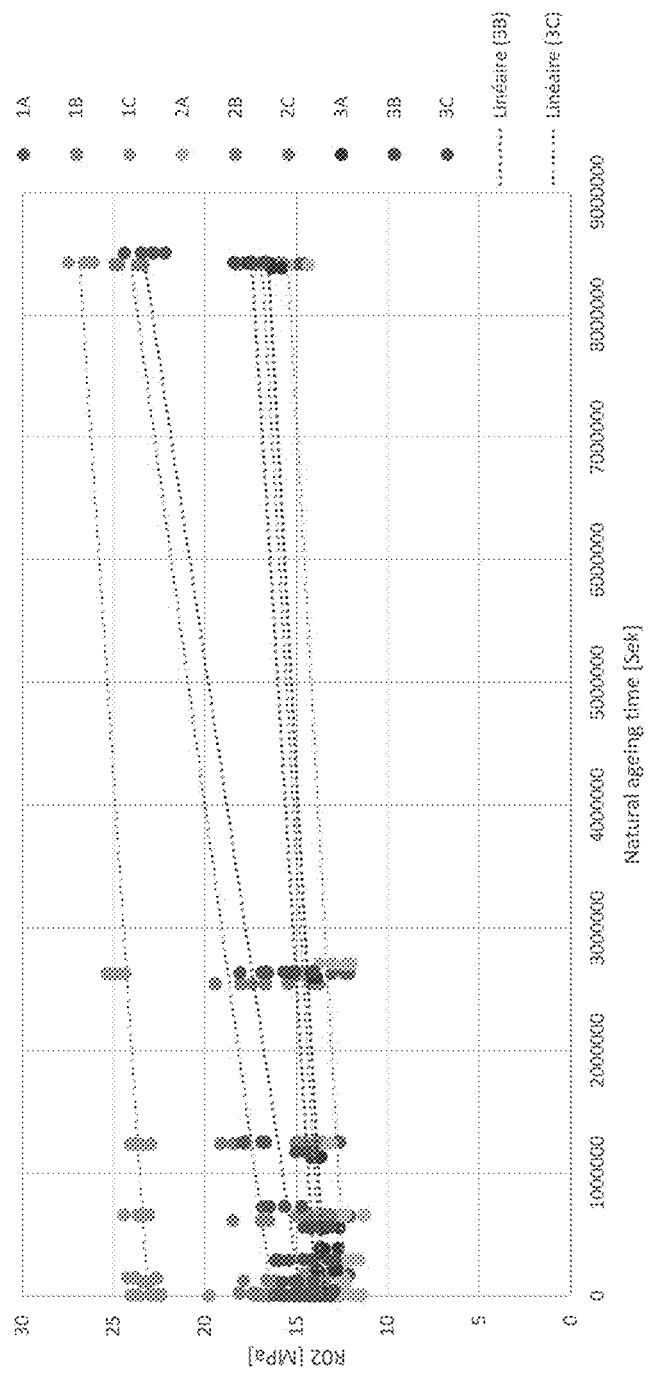

FIG. 6 is a diagram showing measured 0.2% offset yield strength as a function of time of the same Pb—Ca—Sn alloys having the compositions as given in Table 1.

Figure 7:
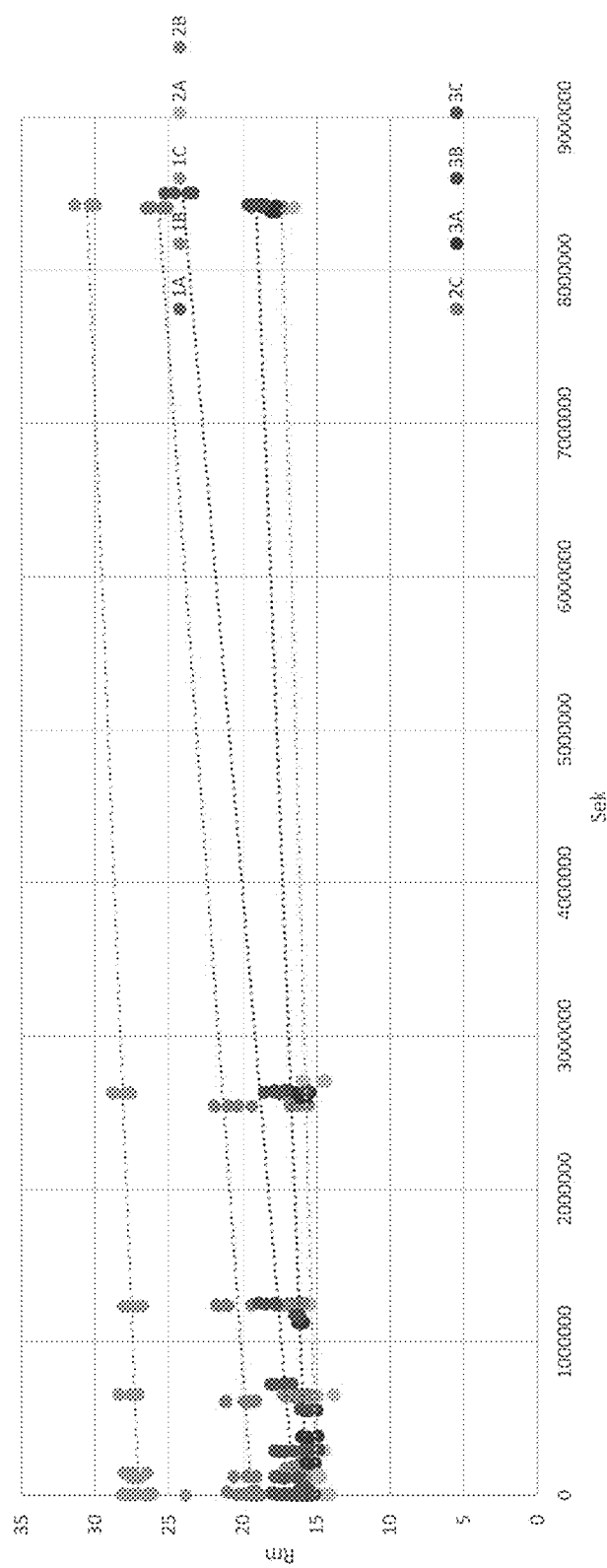

FIG. 7 is a diagram showing measured ultimate yield strength as a function of time of the same Pb—Ca—Sn alloys having the compositions as given in Table 1.

VERIFICATION OF THE INVENTION

A series of Pb—Ca—Sn alloys having the different calcium and tin contents, as summarised in Table 1, were prepared and tested for their extrudability and natural aging properties. The test samples consisted of Pb—Ca—Sn alloy containing from 0.02 to 0.04 weight % Ca and from 0.2 to 0.4 weight % tin. The test samples contained also unavoidable impurities in undetermined minute amounts.

The extrusion tests were performed in a horizontal continuous lead extruder. Samples where extracted directly after extrusion and tensile tested at a constant strain rate of 0.08%/s.

It is expected that Pb—Ca—Sn alloys become harder, i.e. require higher flow stresses to be extruded, with higher calcium contents. This was also observed in the tests as shown graphically in FIG. 5a). The figures present measured flow stress, i.e. the middle value between yield strength and ultimate strength of the alloy samples as a function of strain. The upper curve in FIG. 5a) shows the measured flow stress in MPa for samples 1A, 1B, and 1C. These samples contained relatively small amounts of tin of 0.2 weight %. The figure shows that when the calcium content is increased from 0.015 to 0.039 weight %, the measured flow stress during the extrusion was nearly quadrupled. A similar result was obtained for the samples 2A, 2B, and 2C the samples 2A, 2B, and 2C which had an increased tin content of 0.3 weight %. These results are shown in the middle curve on FIG. 5a), and the

TABLE 1

| Composition of Pb—Ca—Sn alloy samples | | |
|---|---|---|
| | Alloy content [weight %]* | |
| Sample | Ca | Sn |
| 1A | 0.015 | 0.20 |
| 1B | 0.027 | 0.20 |
| 1C | 0.039 | 0.20 |
| 2A | 0.017 | 0.30 |
| 2B | 0.031 | 0.29 |
| 2C | 0.040 | 0.30 |
| 3A | 0.018 | 0.41 |
| 3B | 0.025 | 0.40 |
| 3C | 0.037 | 0.40 |

*The remainder being Pb and unavoidable impurities curve shows an increased flow stress with increased calcium content, however much less as pronounced as for the tests samples 1A, 1B, and 1C. The third curve in FIG. 5a) shows the test results for samples 3A, 3B, and 3C, which all contained about 0.4 weight % tin. In these samples there are no sign of increased flow stress with increased calcium content. Sample 3A with 0.015 weight % Ca has the same low flow stress as sample 3C with 0.04 weight % Ca.

The same effect is also illustrated in the curves of FIG. 5b). The upper curve shows the flow stress for samples 1C, 2C, and 3C, which all had about 0.04 weight % Ca, as a function of tin content. Th curve show a strong reduction of flow stress with increased tin content. The middle curve displays the flow stress for samples 1B, 2B, and 3B, which all had about 0.03 weight % Ca. It is a clear reduction in flow stress with increased tin content. The lower curve shows the same result for samples 1A, 2A, and 3A, which all had relatively low Ca-contents of about 0.02 weight %. For these alloys, the tin content gave no significant reduction in flow stress.

The natural aging of the Pb—Ca—Sn alloy samples was investigated by measuring the 0.2% offset yield strength, $R_{0.2}$, at different time intervals from extrusion (time 0) up to about three months (9 000 000 seconds), and further by measuring the ultimate tensile strength, $R_m$ at the same time intervals.

The results of the $R_{0.2}$ measurements are presented in FIG. 6. As seen on the figure, the sample 1C which had a high Ca content and low Sn content has a relatively high $R_{0.2}$ at all times. Pb—Ca—Sn alloy sample 1C is tough to extrude and shows moderate natural aging of about 15-20% increase in $R_{0.2}$ over three months but has good strength. The lower bundle of curves in FIG. 4, presents the $R_{0.2}$ as a function of time for the samples 1A, 2A, and 3A, which had relatively low Ca contents, and 1B, 2B, and 3B, which had moderately high Ca contents. All these Pb—Ca—Sn alloy samples had relatively low $R_{0.2}$ shortly after extrusion but showed only a moderate natural aging of 25-30% increase in $R_{0.2}$ over three months. The curves for Pb—Ca—Sn alloy samples 2C and 3C show that these samples have the benefit of having, despite containing relatively high levels of Ca, a relatively low $R_{0.2}$ at time 0 which is comparable with the $R_{0.2}$ of Pb—Ca—Sn alloy samples having low Ca contents, and by having a significantly larger natural aging of around 40% increase in $R_{0.2}$ over three months for sample 2C (0.04 Ca and 0.3 Sn) and around 50% increase in $R_{0.2}$ over three months for sample 3C (0.04 Ca and 0.4 Sn).

The results of the $R_m$ measurements are presented in FIG. 7. As seen on the figure, the $R_m$ measurements gave similar results as the $R_{0.2}$ measurements and confirmed thus those results. A Pb—Ca—Sn alloy having relatively high Ca contents of from 0.03 to 0.04 weight % Ca and relatively high amounts of Sn from 0.3 weight % or more, is relatively easy to extrude but hardens by natural aging to a relatively strong and resilient material well suited for use as cable sheathing, and which obtains after natural aging an ultimate tensile strength and a 0.2% offset yield strength of around 25 MPa. This yield strength is about 20% higher than alloy E.

The extrusion output obtained in the extrusion tests was between 21 and 22 kg/min. As a comparison, a similar extrusion test was performed with an E-alloy (PB021K). In the latter case it was obtained an extrusion output of 18 kg/min.

REFERENCES

1. Sivaraman Guruswamy (2000), "Engineering Properties and Applications of Lead Alloys", Marcel Decker Inc., pp. 579, ISBN: 0-8247-8247-X
2. M. Bauser, G. Sauer, and K. Siegert (editors), "Extrusion", $2^{nd}$ edition, ASM International (2006), p. 128, ISBN-13: 978-0-87170-873-3

The invention claimed is:

1. A method for manufacturing a cable sheathing onto a power cable, wherein the method comprises the following steps:
   applying by an extruder
      a supply of molten Pb—Ca—Sn alloy, and
      a die-head adapted to receive the power cable to be coated and to exit the cable and simultaneously form a coating of supplied Pb—Ca—Sn alloy onto the power cable,
   wherein the Pb—Ca—Sn alloy has a composition comprising of from 0.0325 to 0.05 weight % Ca and of from 0.4 to 0.8 weight % Sn, based on the total mass of the alloy and where the balance is Pb and unavoidable impurities,
   wherein the extruder further has a stem adapted to solidify the Pb—Ca—Sn alloy and having an inlet fluidly connected to the supply of molten Pb—Ca—Sn alloy and an outlet for solidified Pb—Ca—Sn alloy, and
   the die-head has a cavity fluidly connected to the outlet for solidified Pb—Ca—Sn alloy, and
   wherein the method further comprises the steps of:
      supplying the Pb—Ca—Sn alloy at a temperature of from 350 to 380° C. to the stem of the extruder, and
      cooling and solidifying the Pb—Ca—Sn alloy inside the stem of the extruder to a temperature in the range of from 180 to 250° C. when exiting the stem and entering the cavity of the die-head.

2. The method according to claim 1, wherein the Pb—Ca—Sn alloy has a tin content of from 0.425 to 0.8 weight %, based on the total mass of the Pb—Ca—Sn alloy.

3. The method according to claim 1, wherein the Pb—Ca—Sn alloy further comprises one or more of: Ni, Cu, As, Zn, Ag, Sb, Te, or Cd, as unavoidable impurities, each element is present in an amount of maximum 0.002 weight %, the balance is Pb.

4. The method according to claim 1, wherein the temperature of the Pb—Ca—Sn alloy inside the stem of the extruder is of from 190 to 225° C., when exiting the stem and entering the cavity of the die-head.

5. The method according to claim 1, wherein the cooling of the temperature of the Pb—Ca—Sn alloy inside the stem of the extruder is regulated by a cooling fluid flowing thorough one or more cooling fluid conduits in the wall of the stem, and where the flow volume of the cooling fluid through the cooling fluid conduits is regulated according to output from a temperature sensor reading the temperature the Pb—Ca—Sn alloy at the exit of the stem.

6. The method according to claim 5, wherein the regulation of the cooling of the temperature of the Pb—Ca—Sn alloy inside the stem is adapted to reach, from its initial molten state, a temperature of 180 to 250° C., in less than 3 minutes.

7. The method according to claim 1, wherein the extrusion of the sheathing is performed at flow volumes giving a travel time of the Pb—Ca—Sn alloy through the extruder of less than 7 minutes.

8. The method according to claim 1, wherein the Pb—Ca—Sn alloy has a calcium content of from 0.035 to 0.05 weight %, based on the total mass of the Pb—Ca—Sn alloy.

9. The method according to claim 8, wherein the Pb—Ca—Sn alloy has a calcium content of from 0.040 to 0.05 weight %, based on the total mass of the Pb—Ca—Sn alloy.

10. The method according to claim 9, wherein the Pb—Ca—Sn alloy has a calcium content of from 0.040 to 0.045 weight %, based on the total mass of the Pb—Ca—Sn alloy.

11. The method according to claim 2, wherein the Pb—Ca—Sn alloy has a tin content of from 0.45 to 0.8 weight %, based on the total mass of the Pb—Ca—Sn alloy.

12. The method according to claim 11, wherein the Pb—Ca—Sn alloy has a tin content of from 0.5 to 0.8 weight %, based on the total mass of the Pb—Ca—Sn alloy.

13. The method according to claim 12, wherein the Pb—Ca—Sn alloy has a tin content of from 0.5 to 0.7 weight %, based on the total mass of the Pb—Ca—Sn alloy.

\* \* \* \* \*